United States Patent
Barawkar et al.

(10) Patent No.: US 12,457,573 B2
(45) Date of Patent: Oct. 28, 2025

(54) SESSION MANAGEMENT FUNCTION (SMF) OUTAGE PROTECTION IN A WIRELESS COMMUNICATION NETWORK

(71) Applicant: T-MOBILE INNOVATIONS LLC, Overland Park, KS (US)

(72) Inventors: Kunal Prakash Barawkar, Bothell, WA (US); John Paul Tuscano Cruz, Renton, WA (US); Swetha Gopisetti, Issaquah, WA (US); Aziz Motiwala, Bothell, WA (US); Praveen Singaram Muthukumar, Lawrenceville, NJ (US); Rahul Pal, Bothell, WA (US); Rushabhkumar Dahyabhai Patel, Newcastle, WA (US); Suresh Thanneeru, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 701 days.

(21) Appl. No.: 17/890,930

(22) Filed: Aug. 18, 2022

(65) Prior Publication Data

US 2024/0064680 A1   Feb. 22, 2024

(51) Int. Cl.
*H04W 60/00* (2009.01)
*H04W 24/04* (2009.01)

(52) U.S. Cl.
CPC ........... *H04W 60/00* (2013.01); *H04W 24/04* (2013.01)

(58) Field of Classification Search
CPC ..... H04W 36/12; H04W 24/04; H04W 76/18; H04W 76/25; H04W 76/19; H04W 36/0011; H04L 41/0894; H04L 41/0893; H04L 41/40; H04L 41/0663; H04L 41/0668; H04L 43/10

See application file for complete search history.

(56) References Cited

U.S. PATENT DOCUMENTS

| | | | |
|---|---|---|---|
| 10,397,892 B2 | 8/2019 | Vrzic et al. | |
| 10,462,840 B2 | 10/2019 | Dao et al. | |
| 10,785,637 B2 | 9/2020 | Qiao et al. | |
| 10,932,218 B2 | 2/2021 | Baek et al. | |
| 10,939,345 B2 | 3/2021 | Chong et al. | |
| 11,039,495 B2 * | 6/2021 | Park | H04W 8/08 |
| 2019/0230556 A1 | 7/2019 | Lee | |
| 2020/0374946 A1 | 11/2020 | Bedekar et al. | |
| 2022/0014944 A1 * | 1/2022 | Liang | H04W 76/19 |
| 2024/0188020 A1 * | 6/2024 | Gupta | H04W 12/06 |

FOREIGN PATENT DOCUMENTS

WO   WO-2020030275 A1 *   2/2020   ......... H04L 43/0817

* cited by examiner

*Primary Examiner* — Matthew C Sams

(57) ABSTRACT

A wireless communication network handles Session Management Function (SMF) outage in a Tracking Area (TA). An external SMF that is outside the TA registers with an internal Network Repository Function (NRF) that is inside in the TA. The internal NRF detects the SMF outage for an internal SMF inside the TA. The internal NRF receives an SMF request from an internal Access and Mobility Management Function (AMF) inside the TA. In response to the SMF outage, the internal NRF transfers an SMF response to the internal AMF that indicates the external SMF. The external SMF receives network signaling from the internal AMF and responsively directs an external User Plane Function (UPF) that is outside the TA to exchange user data with internal wireless access nodes that are inside the TA.

20 Claims, 11 Drawing Sheets

SESSION MANAGEMENT FUNCTION (SMF) OUTAGE PROTECTION IN A WIRELESS COMMUNICATION NETWORK

TECHNICAL BACKGROUND

Wireless communication networks provide wireless data services to wireless user devices. Exemplary wireless data services include user data messaging, machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless network elements comprise Access and Mobility Management Functions (AMFs), Session Management Functions (SMFs), User Plane Functions (UPFs), and the like. The wireless network elements discover one another over Network Repository Functions (NRFs). For example, an SMF may register with an NRF, and an AMF may discover the SMF by querying the NRF for an SMF.

Wireless communication networks are geographically separated into mutually exclusive Tracking Areas (TAs). The wireless access nodes broadcast the TAs that they occupy, and the wireless access nodes report the current TAs that they occupy to the wireless communication networks. The wireless communication networks use the TA reports to locate and deliver messages to the wireless user devices. The NRFs also use the TAs to select proximate wireless network elements for the wireless user devices. For example, an NRF selects an SMF for a wireless user device that is in the same TA as the wireless user device.

Unfortunately, some TAs cannot efficiently host multiple SMFs. For example, geographic islands like Puerto Rico and Hawaii may not have multiple SMFs. Moreover, the NRFs do not efficiently replace these sole SMFs when SMF outages occur. As a result, wireless data services are lost in the TA during the SMF outage.

TECHNICAL OVERVIEW

A wireless communication network handles Session Management Function (SMF) outage in a Tracking Area (TA). An external SMF that is outside the TA registers with an internal Network Repository Function (NRF) that is inside in the TA. The internal NRF detects the SMF outage for an internal SMF inside the TA. The internal NRF receives an SMF request from an internal Access and Mobility Management Function (AMF) inside the TA. In response to the SMF outage, the internal NRF transfers an SMF response to the internal AMF that indicates the external SMF. The external SMF receives network signaling from the internal AMF and responsively directs an external User Plane Function (UPF) that is outside the TA to exchange user data with internal wireless access nodes that are inside the TA.

DETAILED DESCRIPTION

Figure 1:
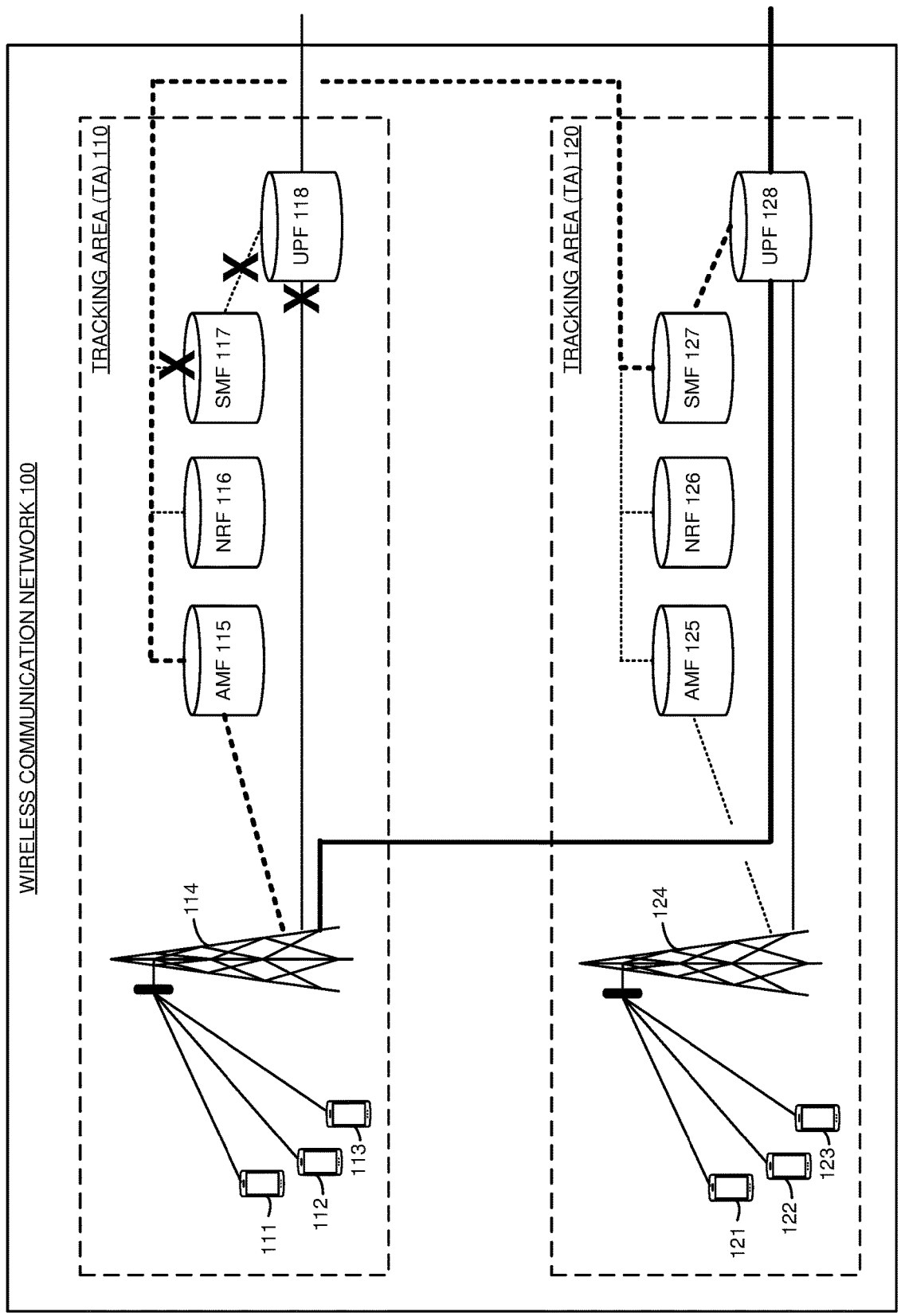
FIG. 1 illustrates an exemplary wireless communication network to handle a Session Management Function (SMF) outage in a Tracking Area (TA).

FIG. 1 illustrates exemplary wireless communication network 100 to handle a Session Management Function (SMF) outage in Tracking Area (TA) 110. Wireless communication network 100 comprises TA 110 and TA 120. TA 110 comprises User Equipment (UEs) 111-113, wireless access node 114, Access and Mobility Management Function (AMF) 115, Network Repository Function (NRF) 116, SMF 117, and User Plane Function (UPF) 118. TA 120 comprises UEs 121-123, wireless access node 124, AMF 125, NRF 126, SMF 127, and UPF 128. Initially, the outage of SMF 117 that is indicated by the X marks on FIG. 1 has not yet occurred. UEs 111-113 and 121-123 comprise phones, computers, controllers, and/or some other user apparatus with communication circuitry that is configured to operate as described below. Wireless communication network 100 delivers data services to UEs 111-113 and 121-123 like internet-access, Internet Protocol Multimedia Subsystem (IMS), machine-control, and/or some other wireless network product. The amount of UEs and wireless access nodes that are depicted on FIG. 1 is restricted for clarity. Wireless communication network 100 typically has many more UEs and wireless access nodes that are configured and operate in a similar manner.

Various examples of network operation and configuration are described herein. In some examples, SMF 117 in TA 110 registers with NRF 116 in TA 110. SMF 127 in TA 120 registers with NRF 126 in TA 120. SMF 127 also registers with NRF 116 in TA 110. NRF 116 receives an SMF request from AMF 115 in TA 110 and transfers an SMF response to AMF 115 that indicates SMF 117. NRF 116 selects SMF 117 over SMF 127 because SMF 117 is in the same TA as UEs 111-113-TA 110. SMF 117 receives network signaling from AMF 115, and in response, SMF 117 directs UPF 118 in TA 110 to exchange user data with wireless access node 114 in TA 110. UEs 111-113 exchange user data over wireless access node 114 and UPF 118.

NRF 126 receives an SMF request from AMF 125 in TA 120 and transfers an SMF response to AMF 125 that indicates SMF 127. NRF 126 selects SMF 127 because SMF 127 is in the same TA as UEs 121-123-TA 120. SMF 127 receives network signaling from AMF 125, and in response, SMF 127 directs UPF 128 in TA 120 to exchange user data with wireless access node 124 in TA 120. UEs 121-123 exchange user data over wireless access node 124 and UPF 128.

NRF 116 detects the SMF outage for SMF 117 in TA 110 that is indicated by the "X" marks on FIG. 1. For example, NRF 116 may receive an outage notice from SMF 117 before a maintenance event or detect a loss of keep-alive signals from SMF 117 during the maintenance event. NRF 116 receives an SMF request from AMF 115, and in response to the SMF outage, NRF 116, transfers an SMF response to AMF 115 that indicates SMF 127 in TA 120. NRF 116 selects SMF 127 because no SMF is available in TA 110 that has UEs 111-113, and because SMF 127 in TA 120 has registered to serve TA 110. SMF 127 in TA 120 receives network signaling from AMF 115 in TA 110, and in response, SMF 127 directs UPF 128 in TA 120 to exchange user data with wireless access node 114 in TA 110. UEs 111-113 now exchange user data over wireless access node 114 and UPF 128.

In some examples, SMF 127 indicates that it is located in TA 120 when registering with NRF 116. NRF 116 then selects SMF 127 for the NRF response during the outage of SMF 117 based on the location of SMF 127 in the TA 120. NRF 116 may have a prioritized list of TAs to use when selecting an SMF where the top preference is the same TA as the UE being served. In some examples, SMF 127 indicates that it will serve as a primary SMF in TA 110 when registering with NRF 116. NRF 116 then selects SMF 127 for the NRF response during the outage of SMF 117 based on the primary SMF indication from SMF 127—and possibly the prioritized TA list. In some examples, TA 110 comprises a geographic island like Puerto Rico or Hawaii. In some examples, the exchange of the user data by UPFs 118 and 128 comprises an internet-access service, Internet Protocol Multimedia Subsystem (IMS) service, machine-control service, or some other wireless network product.

Advantageously, TA 110 hosts a single SMF 117 and avoids excessive SMF costs. Moreover, NRF 116 efficiently replaces SMF 117 in TA 110 with SMF 127 in TA 120 when an outage occurs to SMF 117. Wireless data services are not lost in TA 110 because of SMF outages.

Wireless UEs 111-113 and 121-123 and wireless access nodes 114 and 124 comprise radios that wirelessly communicate using wireless protocols Fifth Generation New Radio (5GNR), Institute of Electrical and Electronic Engineers (IEEE) 802.11 (WIFI), Near Field Communications (NFC), Low-Power Wide Area Network (LP-WAN), Code Division Multiple Access (CDMA), Frequency Division Multiple Access (FDMA), Time Division Multiple Access (TDMA), and/or some other ad-wireless networking protocol. Wireless UEs 111-113 and 121-123, wireless access nodes 114 and 124, AMFs 115 and 125, NRFs 116 and 126, SMFs 117 and 127, and UPFs 118 and 128 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Figure 2:
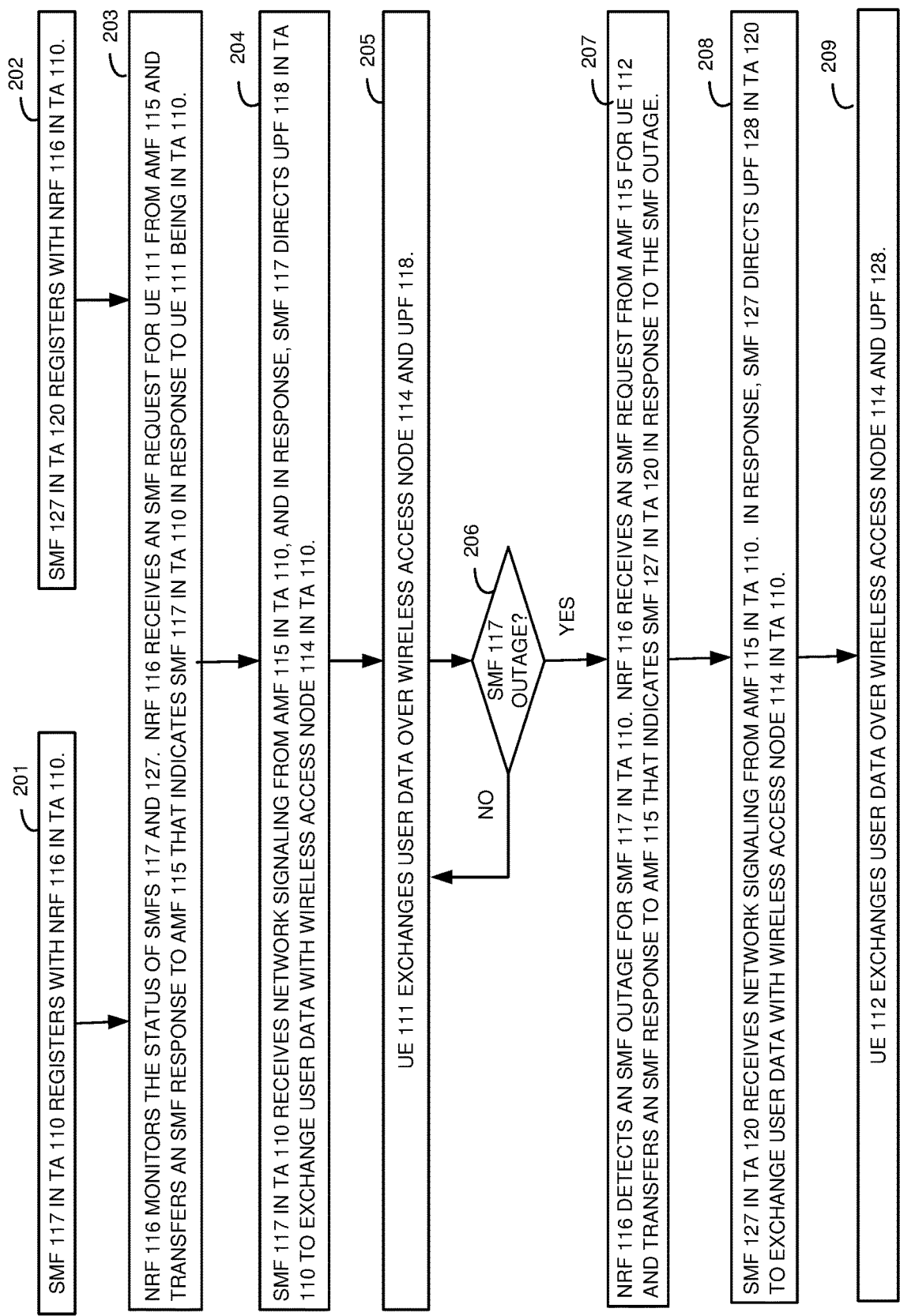
FIG. 2 illustrates an exemplary operation of the wireless communication network to handle the SMF outage in the TA.

FIG. 2 illustrates an exemplary operation of wireless communication network 100 to handle the SMF outage in TA 110. The operation may differ in other examples. SMF 117 in TA 110 registers with NRF 116 in TA 110 (201). Contemporaneously, SMF 127 in TA 120 registers with NRF 116 in TA 110 (202). NRF 116 monitors the status of registered SMFs 117 and 127—possibly through SMF notices (203). NRF 116 receives an SMF request for UE 111 from AMF 115 and transfers an SMF response to AMF 115 that indicates SMF 117 in TA 110— because SMF 117 is in the same TA as UE 111 (203). SMF 117 in TA 110 receives network signaling from AMF 115 in TA 110, and in response, SMF 117 directs UPF 118 in TA 110 to exchange user data with wireless access node 114 in TA 110 (204). UE 111 exchanges user data over wireless access node 114 and UPF 118 (205). When SMF 117 continues to operate properly (206), UE 111 continues to exchange user data over wireless access node 114 and UPF 118 (205).

When SMF 117 experiences an outage (206), NRF 116 detects the outage for SMF 117 in TA 110 (207). NRF 116 receives an SMF request from AMF 415 for UE 112 and transfers an SMF response to AMF 115 that indicates SMF 127 in TA 120 in response to the SMF outage (207). SMF 116 selects SMF 127 because no SMF is available in TA 110 that has UE 112, and SMF 127 has registered to serve TA 110. SMF 127 in TA 120 receives network signaling from AMF 115 in TA 110 (208). In response, SMF 127 directs UPF 128 in TA 120 to exchange user data with wireless access node 114 in TA 110 (208). UE 112 exchanges user data over wireless access node 114 and UPF 128 (209).

Figure 3:
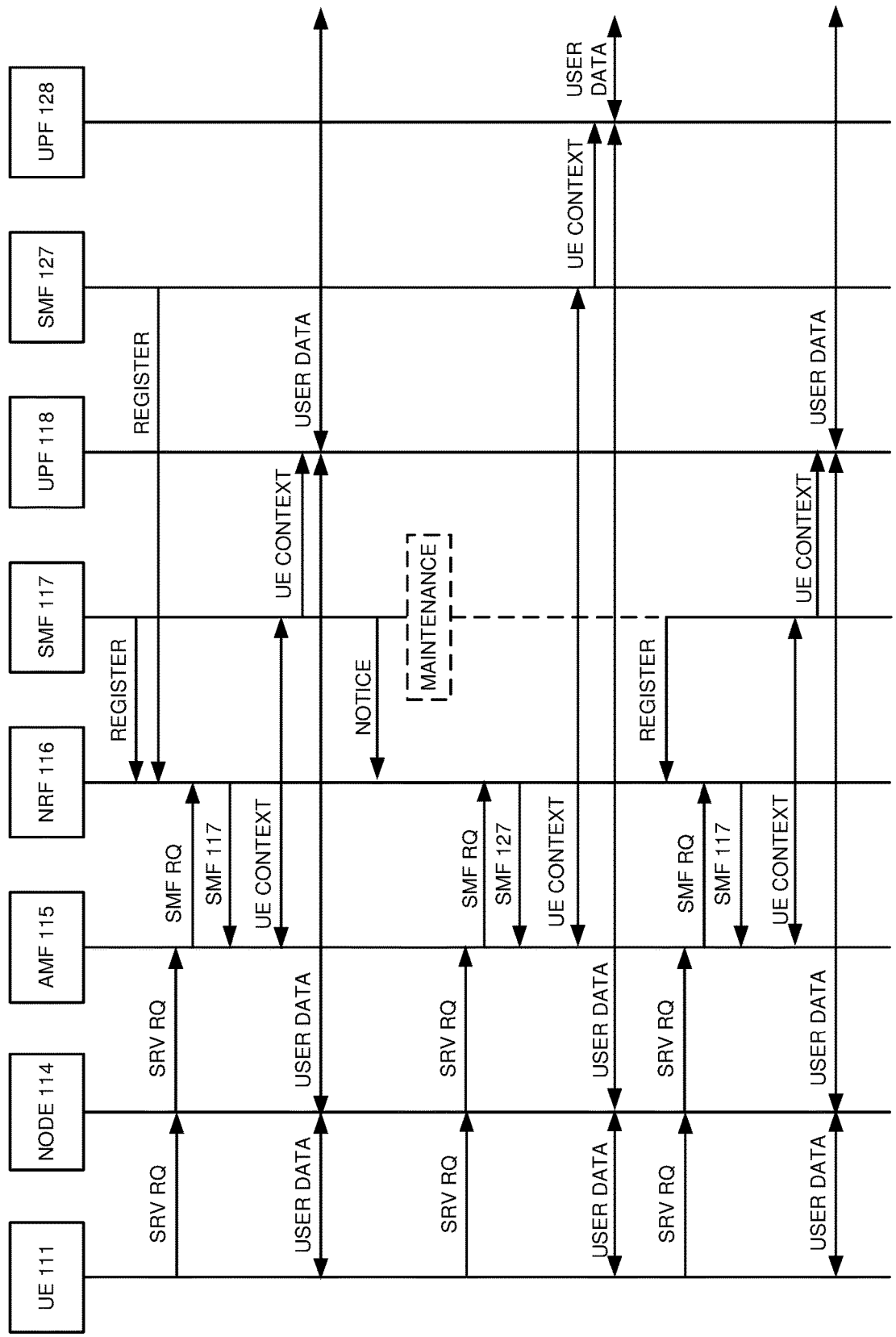
FIG. 3 illustrates an exemplary operation of the wireless communication network to handle the SMF outage in the TA.

FIG. 3 illustrates an exemplary operation of wireless communication network 100 to handle the SMF outage in TA 110. The operation may differ in other examples. SMF 117 in TA 110 registers with NRF 116 as a primary SMF in TA 110. SMF 127 in TA 120 registers with NRF 116 as an SMF from TA 120 that can serve network functions in TA 110. UE 111 transfers a service request (SRV RQ) that indicates TA 110 to AMF 115 over wireless access node 114. The service request might comprise a Registration/Protocol Data Unit (PDU) Establishment Request. To serve UE 111, AMF 115 transfers an SMF request to NRF 116. NRF 116 receives the SMF request from AMF 115 and selects SMF 117, because SMF 117 is a primary SMF in the same TA as UE 111. NRF 116 indicates selected SMF 117 to AMF 115. AMF 115 and SMF 117 exchange signaling to develop UE context for UE 111. For example, AMF 115 may transfer a Registration/PDU Establishment Request from UE 111 to SMF 117. SMF 117 directs UPF 118 to exchange user data for UE 111 between wireless access node 114 and external systems. UE 111 exchanges user data over wireless access node 114 and UPF 118.

SMF 117 transfers an outage notice to NRF 116 prior to undergoing maintenance. NRF 116 detects the SMF outage based on the outage notice. UE 111 transfers another service request that indicates TA 110 to AMF 115 over wireless access node 114. To serve UE 111, AMF 115 transfers an SMF request to NRF 116. NRF 116 receives the SMF request from AMF 115 and selects SMF 127, because no primary SMFs in TA 110 are available, and because SMF 127 in TA 120 has registered to serve as an SMF in TA 110. NRF 116 may use the prioritized list of TAs to select TA 120 and primary SMF 127 when no primary SMFs are available in TA 110. For example, the prioritized list may have TA 110 as the first priority for SMF selection and have TA 120 as the second priority for SMF selection. NRF 116 indicates selected SMF 127 to AMF 115. AMF 115 and SMF 127 exchange signaling to develop UE context for UE 111. SMF 127 directs UPF 128 to exchange user data for UE 111 between wireless access node 114 and external systems. UE 111 exchanges user data over wireless access node 114 and UPF 128.

After the completion of the maintenance, SMF 117 again registers with NRF 116 as a primary SMF in TA 110. UE 111 transfers another service request that indicates TA 110 to AMF 115 over wireless access node 114. To serve UE 111, AMF 115 transfers an SMF request to NRF 116. NRF 116 selects SMF 117, because SMF 117 is again a primary SMF that is in the same TA as UE 111. NRF 116 indicates selected SMF 117 to AMF 115. AMF 115 and SMF 117 exchange signaling to develop UE context for UE 111. SMF 117 directs UPF 118 to exchange user data for UE 111 between wireless access node 114 and external systems. UE 111 exchanges user data over wireless access node 114 and UPF 118.

Figure 4:
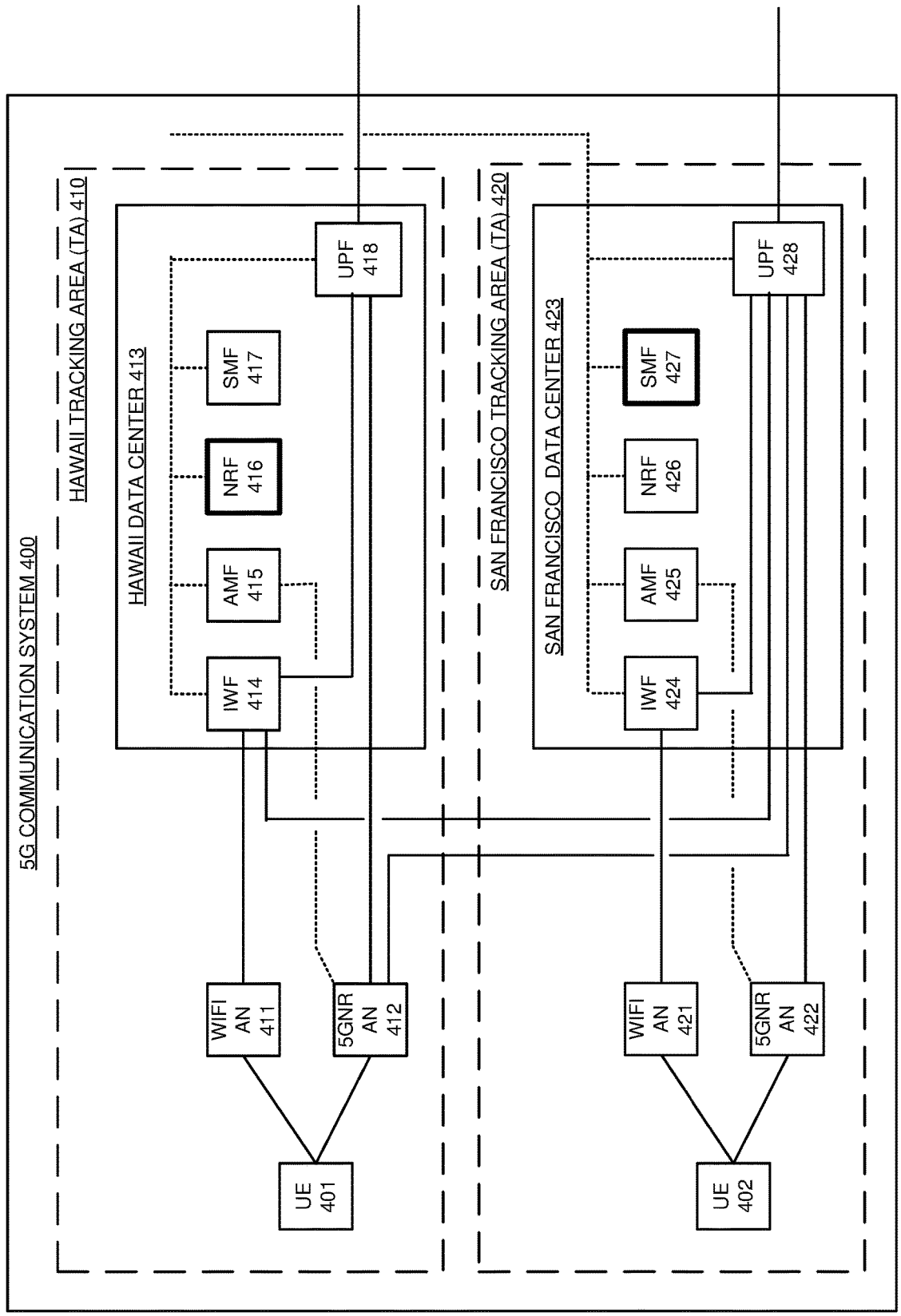
FIG. 4 illustrates an exemplary Fifth Generation (5G) communication network to handle SMF outages.

FIG. 4 illustrates exemplary Fifth Generation (5G) communication network 400 to handle SMF outages. 5G communication network 400 comprises an example of wireless communication network 100, although network 100 may differ. 5G communication network 400 comprises Hawaii TA 410 and San Francisco TA 420. Hawaii TA 410 comprises UE 401, Access Nodes (ANs) 411-412, and Hawaii data center 413. Hawaii data center 413 comprises Interworking Function (IWF) 414, Access and Mobility Management Function (AMF) 415, Network Repository Function (NRF) 416, SMF 417, and User Plane Function (UPF) 418. San Francisco TA 420 comprises UE 402, ANs 421-422, and San Francisco data center 423. San Francisco data center 423 comprises IWF 424, AMF 425, NRF 426, SMF 427, and UPF 428. Data center 413 and 423 typically include additional network elements like and Unified Data Management (UDM) and Policy Control Function (PCF) that are omitted for clarity. The amount of UEs and ANs has been restricted for clarity on FIGS. 4, and 5G communication network 400 typically has many more UEs and ANs than shown.

In Hawaii TA 410, NRF 416 maintains a prioritized TA list for SMF selection that has Hawaii TA 410 as the first priority and San Francisco TA 410 as the second priority. SMF 417 registers with NRF 416 as a primary SMF that is located in Hawaii TA 410. In San Francisco TA 420, SMF 427 registers with NRF 426 as a primary SMF that is located in San Francisco TA 420. SMF 427 also registers with NRF 416 as a primary SMF for Hawaii TA 410 that is located in San Francisco TA 420. The discussion continues below with respect to FIG. 5.

Figure 5:
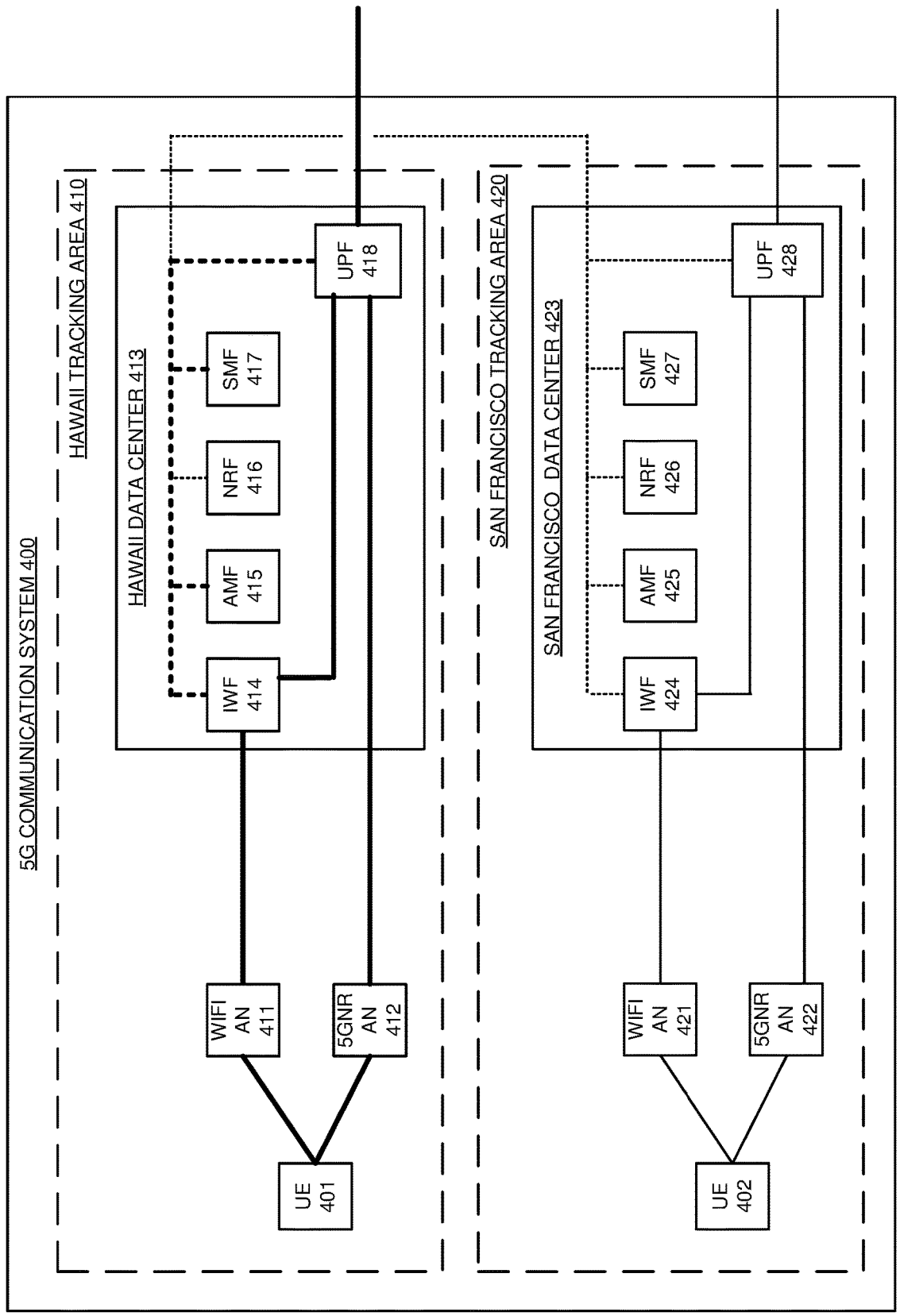
FIG. 5 illustrates the exemplary 5G communication network to handle the SMF outages.

FIG. 5 further illustrates exemplary 5G communication network 400 to handle the SMF outages. The discussion continues from FIG. 4 above. UE 401 attaches to 5GNR AN 412 and registers with AMF 415 over 5GNR AN 412. UE 401 may also attach to WIFI AN 411 and establish secure communications with IWF 414 over WIFI AN 411, and then UE 401 may register with AMF 415 over WIFI AN 411 and IWF 414. During these registrations, UE 401 indicates its location in Hawaii TA 410. To serve UE 401, AMF 415 transfers an SMF request for UE 401 to NRF 416 and indicates that UE 401 is located in Hawaii TA 410. NRF 416 receives the SMF request from AMF 415 and selects SMF 417, because SMF 417 is a primary SMF in Hawaii TA 410 which includes UE 401. NRF 416 indicates selected SMF 417 to AMF 415. AMF 415 transfers the Registration/PDU Establishment Request from UE 401 to SMF 417 and they exchange signaling to develop UE context for UE 401. SMF 417 directs UPF 418 to exchange user data for UE 401 between 5GNR AN 412 and external systems and/or between IWF 414 and the external systems. As shown in bold lines on FIG. 5, UE 401 exchanges user data over 5GNR AN 412 and UPF 418 and/or WIFI AN 411, IWF 414, and UPF 418. The user data exchange supports network services like internet-access, IMS, and machine-control.

UE 402 attaches to 5GNR AN 422 and registers with AMF 425 over 5GNR AN 422. UE 402 may also attach to WIFI AN 421 and establish secure communications with IWF 424 over WIFI AN 421, and then UE 402 may register with AMF 425 over WIFI AN 421 and IWF 424. During these registrations, UE 402 indicates its location in San Francisco TA 420. To serve UE 402, AMF 425 transfers an SMF request for UE 402 to NRF 426 and indicates that UE 402 is located in San Francisco TA 420. NRF 426 receives the SMF request from AMF 425 and selects SMF 427, because SMF 427 is a primary SMF in San Francisco TA 420 that also includes UE 402. NRF 426 indicates selected SMF 427 to AMF 425. AMF 425 transfers the Registration/PDU Establishment Request from UE 402 to SMF 427 and they exchange signaling to develop UE context for UE 402. SMF 427 directs UPF 428 to exchange user data for UE 402 between 5GNR AN 422 and external systems and/or between IWF 424 and the external systems. UE 402 exchanges user data over 5GNR AN 422 and UPF 428 and/or WIFI AN 421, IWF 424, and UPF 428. The user data exchange supports network services like internet-access, IMS, and machine-control. The discussion continues below with respect to FIG. 6.

Figure 6:
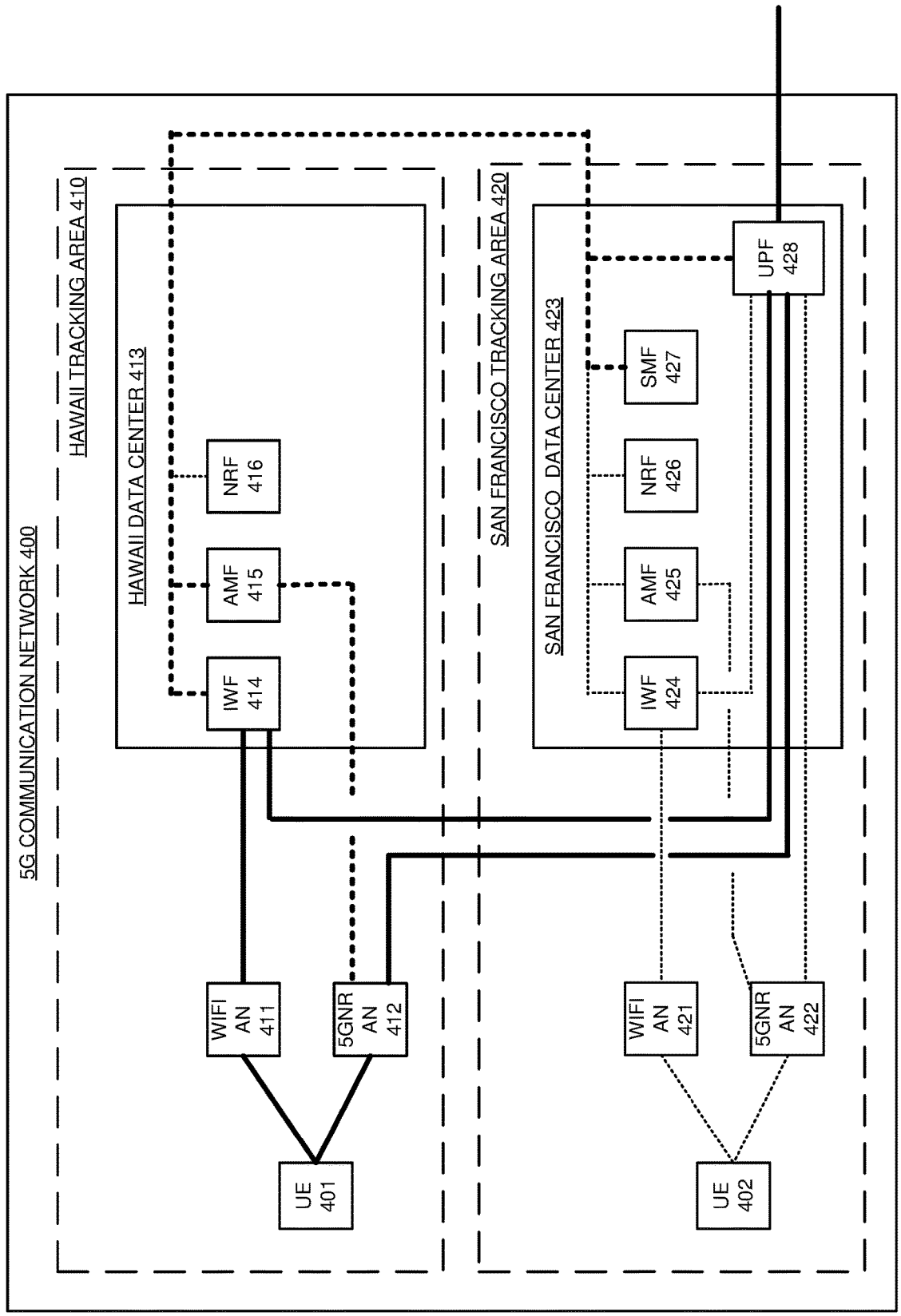
FIG. 6 illustrates the exemplary 5G communication network to handle the SMF outages.

FIG. 6 further illustrates exemplary 5G communication network 400 to handle the SMF outages. The discussion continues from FIG. 5 above. SMF 417 undergoes maintenance, so SMF 417 and UPF 418 are not available and are not shown on FIG. 6. NRF 416 detects the SMF outage for SMF 417 in response to a prior outage notice from SMF 417. UE 401 transfers a Registration/PDU Establishment Request that indicates Hawaii TA 410 to AMF 415 over 5GNR AN 412 or WIFI AN 411 and IWF 414. To serve UE 401, AMF 415 transfers an SMF request to NRF 416. NRF 416 receives the SMF request from AMF 415 and selects SMF 427, because no primary SMFs are currently available in Hawaii TA 410, and SMF 427 in San Francisco TA 420 is available as a primary SMF for Hawaii TA 410. NRF 416 uses the prioritized list of TAs to select San Francisco TA 420 and SMF 427 over other SMFs in other TAs when no primary TAs are available in top-priority Hawaii TA 410. NRF 416 indicates selected SMF 427 to AMF 415. AMF 415 transfers the Registration/PDU Establishment Request from UE 401 to SMF 427 and they exchange signaling to develop UE context for UE 401. SMF 427 directs UPF 428 (or another UPF in San Francisco TA 420) to exchange user data for UE 401 between 5GNR AN 412 and/or IWF 414 and external systems. As indicated by the bold lines on FIG. 6, UE 401 exchanges user data over 5GNR AN 412 and UPF 428 and/or WIFI AN 411, IWF 414, and UPF 428.

UE 402 continues to exchange user data over 5GNR AN 422 and UPF 428 and/or WIFI AN 421, IWF 424, and UPF 428. After the completion of the maintenance, SMF 417 again registers with NRF 416 as a primary SMF in Hawaii TA 410, and UE 401 again exchanges user data over 5GNR AN 412 and UPF 418 and/or WIFI AN 411, IWF 414, and UPF 418. Additional NRFs like NRF 416 may be available in Hawaii TA 410, and these NRFs could share SMF registration data. AMF 415 could use one of these other NRFs to discover SMF 427 when NRF 416 has an outage.

Figure 7:
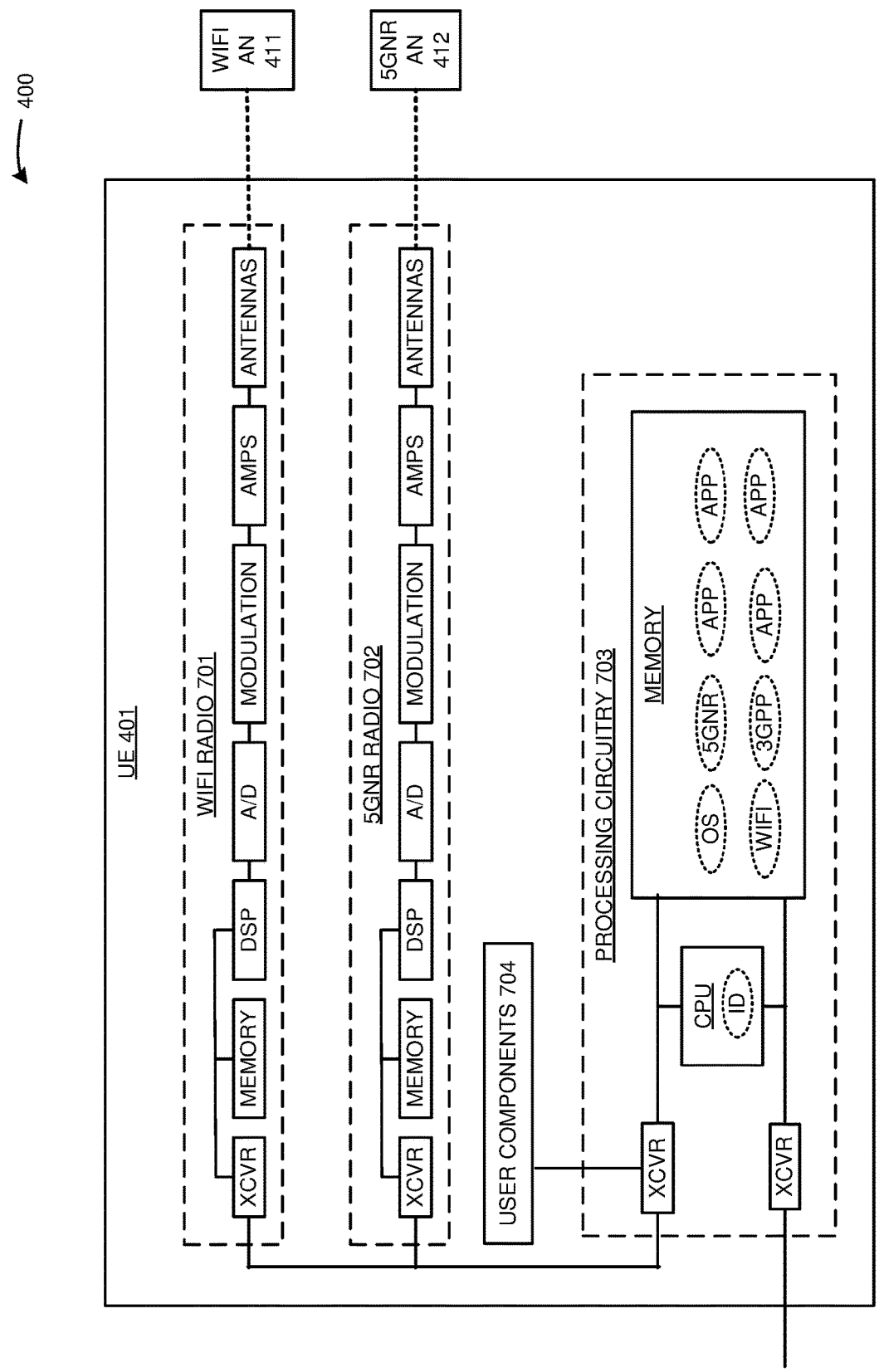
FIG. 7 illustrates an exemplary User Equipment (UE) in the 5G communication network.

FIG. 7 illustrates exemplary User Equipment (UE) 401 in 5G communication network 400. UE 401 comprises an example of UEs 111-113, 121-123, and 402 although UEs 111-113, 121-123, and 402 may differ. UE 401 comprise WIFI radio 701, 5GNR radio 702, processing circuitry 703, and user components 704. Radios 701-702 comprise antennas, amplifiers, filters, modulation, analog-to-digital interfaces, DSP, memory, and transceivers that are coupled over bus circuitry. User components 704 comprise displays, speakers, microphones, controllers, and/or some other user apparatus. Processing circuitry 703 comprises CPU, memory, and transceivers (XCVRs) that are coupled over bus circuitry. The memory in processing circuitry 703 stores an operating system (OS), 5GNR applications (5GNR), WIFI applications (WIFI), Third Generation Partnership Project applications (3GPP), and user applications (APP). The user applications support network services like internet-access, IMS, and machine-control. The antennas in WIFI radio 701 exchange WIFI signals with WIFI AN 411. The antennas in 5GNR radio 702 exchange 5GNR signals with 5GNR AN 412. User components 704 and the transceivers in radios 701-702 are coupled to transceivers in processing circuitry 703. In processing circuitry 703, the CPU retrieves the operating system and applications from the memory and executes the operating system and applications to operate UE 401 as described herein.

Figure 8:
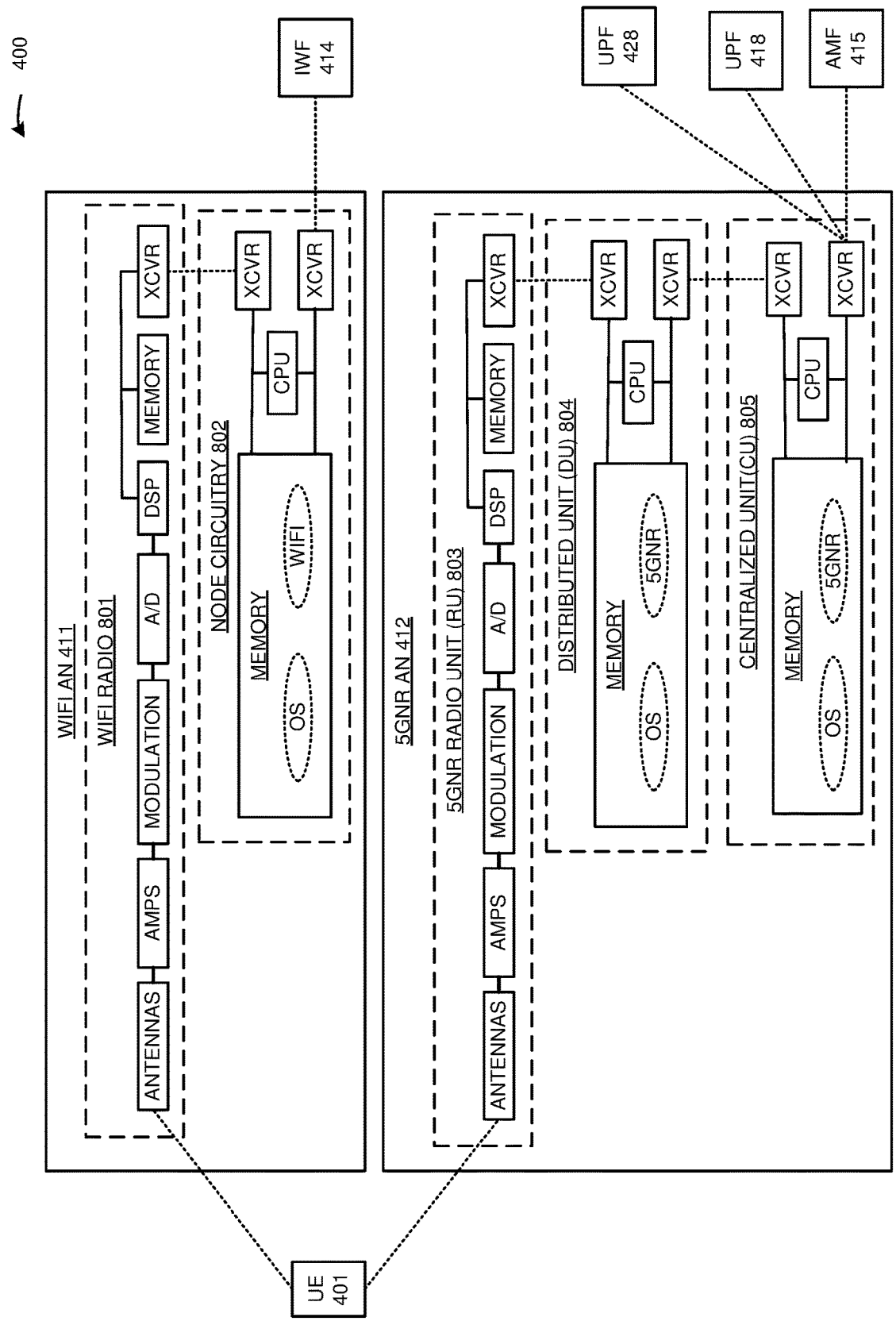
FIG. 8 illustrates exemplary access nodes in the 5G communication network.

FIG. 8 illustrates exemplary access nodes 411-412 in 5G communication network 400. ANs 411-412 comprise examples of wireless access nodes 114 and 124, although nodes 114 and 124 may differ. WIFI AN 411 comprises WIFI radio 801 and node circuitry 802. WIFI radio 801 comprises antennas, amplifiers, filters, modulation, analog-to-digital interfaces, DSP, memory, radio applications, and transceivers that are coupled over bus circuitry. Node circuitry 802 comprises memory, CPU, and transceivers that are coupled over bus circuitry. The memory in node circuitry 802 stores operating system and WIFI applications. The antennas in WIFI radio 801 are wirelessly coupled to UE 401 over WIFI links. Transceivers in WIFI radio 801 are coupled to transceivers in node circuitry 802. Transceivers in node circuitry 802 are coupled to IWF 414. The CPU in node circuitry 802 execute the WIFI applications and operating systems to exchange data and signaling with UE 401 and IWF 414 as described herein.

5GNR AN 412 comprises 5GNR Radio Unit (RU) 803, Distributed Unit (DU) 804, and Centralized Unit (CU) 805. 5GNR RU 803 comprises antennas, amplifiers, filters, modulation, analog-to-digital interfaces, DSP, memory, radio applications, and transceivers that are coupled over bus circuitry. DU 804 comprises memory, CPU, user interfaces and components, and transceivers that are coupled over bus circuitry. The memory in DU 804 stores operating system and 5GNR network applications for physical layer, media access control, and radio link control. CU 805 comprises memory, CPU, and transceivers that are coupled over bus circuitry. The memory in CU 805 stores an operating system and 5GNR network applications for packet data convergence protocol, service data adaption protocol, and radio resource control. The antennas in 5GNR RU 803 are wirelessly coupled to wireless UE 401 over 5GNR links. Transceivers in 5GNR RU 803 are coupled to transceivers in DU 804. Transceivers in DU 804 are coupled to transceivers in CU 805. Transceivers in CU 805 are coupled AMF 415, UPF 418, and UPF 428. The DSP and CPU in RU 803, DU 804, and CU 805 execute the radio applications, operating systems, and network applications to exchange data and signaling with UE 401, AMF 415, UPF 418, and UPF 428 as described herein.

Figure 9:
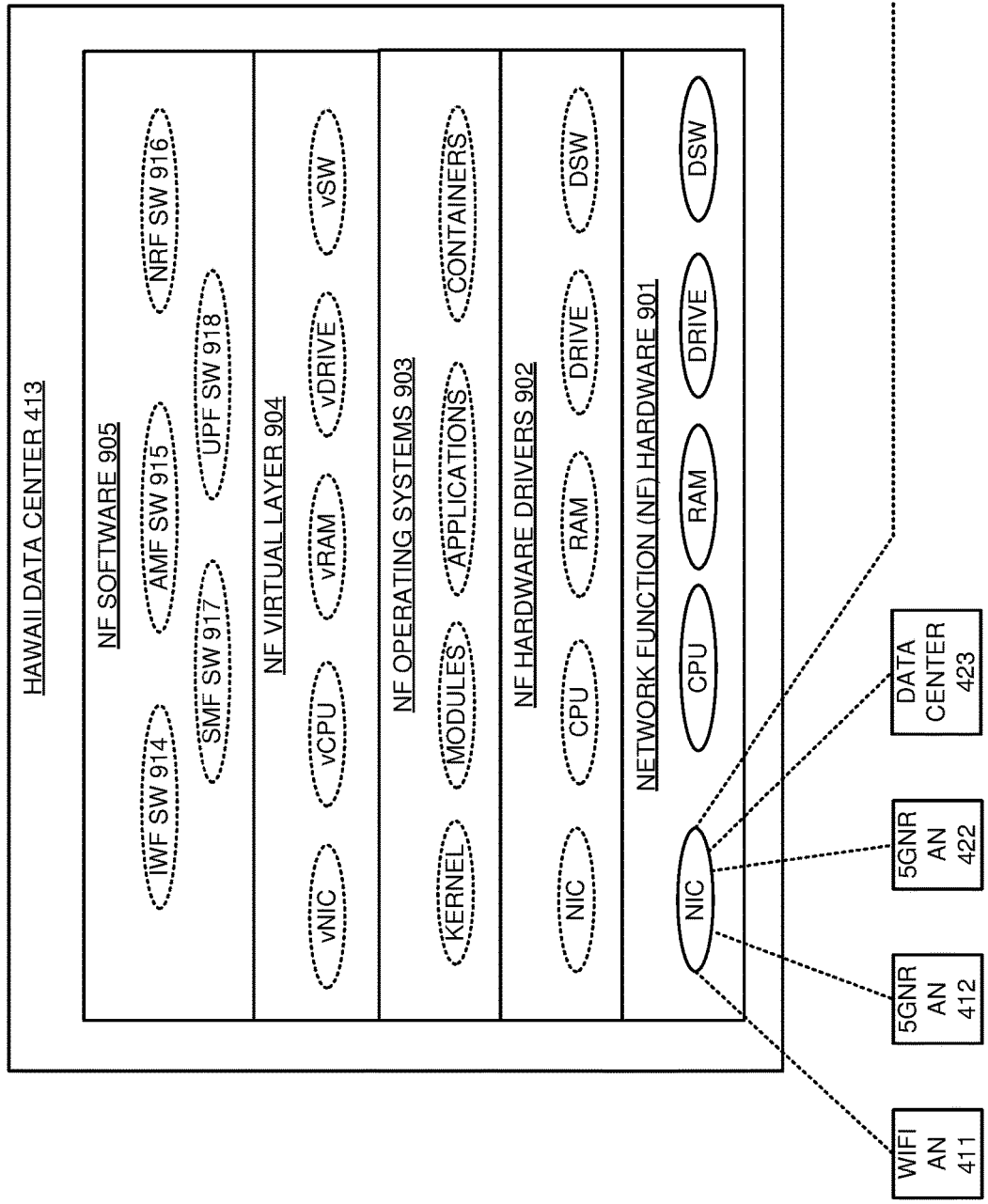
FIG. 9 illustrates an exemplary data center in the 5G communication network.

FIG. 9 illustrates exemplary Hawaii data center 413 in 5G communication system 400. Hawaii data center 413 comprises an example of AMF 115, NRF 116, SMF 117, and UPF 118, although these network functions may differ. Hawaii data center 413 comprises Network Function (NF) hardware 901, NF hardware drivers 902, NF operating systems 903, NF virtual layer 904, and NF Software (SW) 905. NF hardware 901 comprises Network Interface Cards (NICs), CPU, RAM, Flash/Disk Drives (DRIVE), and Data Switches (DSW). NF hardware drivers 902 comprise software that is resident in the NIC, CPU, RAM, DRIVE, and DSW. NF operating systems 903 comprise kernels, modules, and applications that form containers for virtual layer and NF software execution. NF virtual layer 904 comprises vNIC, vCPU, vRAM, vDRIVE, and vSW. NF SW 905 comprises IWF SW 914, AMF SW 915, NRF SW 916, SMF SW 917, and UPF SW 918. Other NF SW like Policy Control Function (PCF) SW is typically present but is omitted for clarity. Hawaii data center 413 may be located at a single site or be distributed across multiple geographic locations. The NIC in NF hardware 901 are coupled to WIFI AN 411, 5GNR AN 412, 5GNR AN 422, San Francisco data center 423, and external systems. NF hardware 901 executes NF hardware drivers 902, NF operating systems 903, NF virtual layer 904, and NF SW 905 to form and operate IWF 414, AMF 415, NRF 416, SMF 417, and UPF 418 as described herein.

Figure 10:
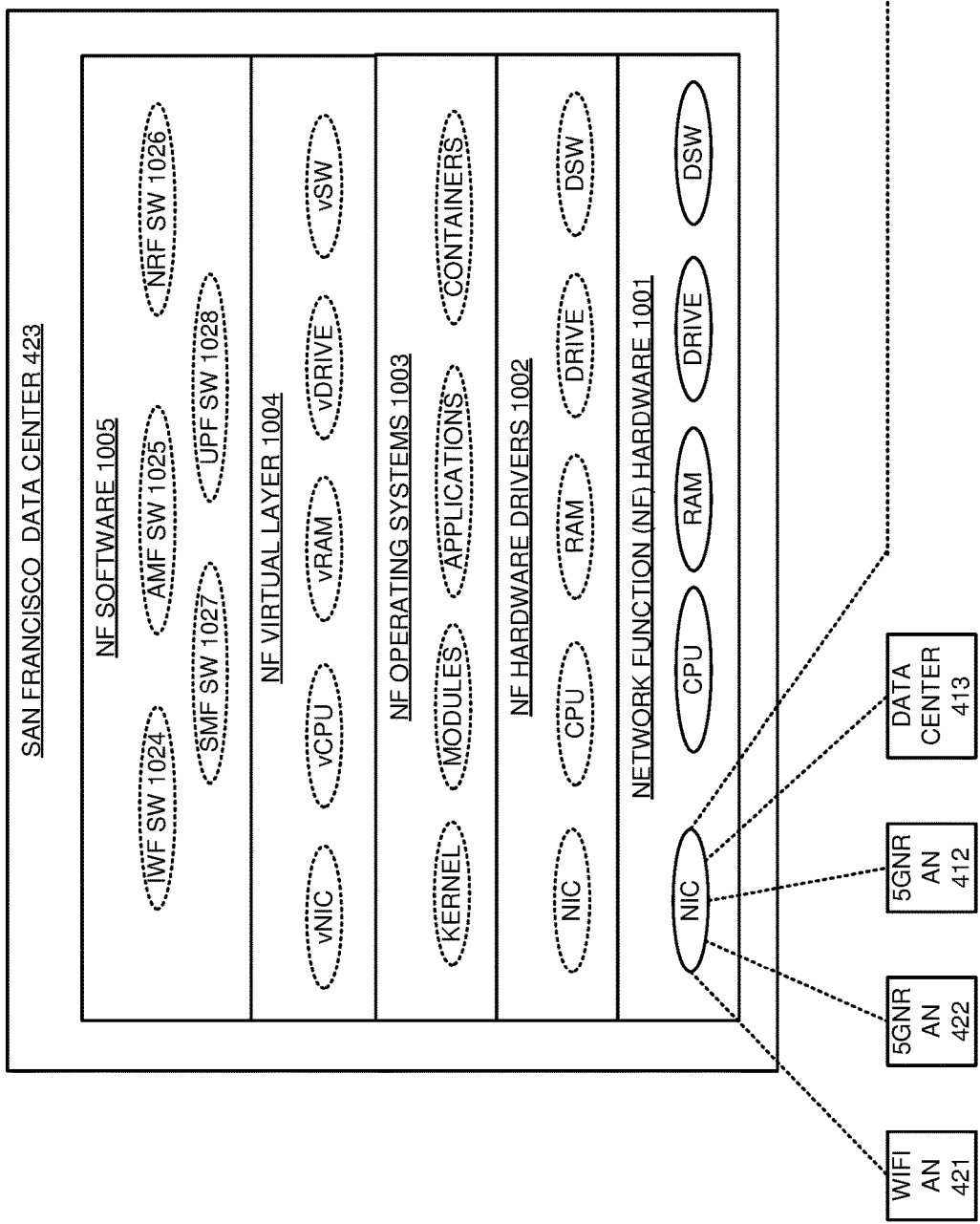
FIG. 10 illustrates another exemplary data center in the 5G communication network.

FIG. 10 illustrates exemplary San Francisco data center 423 in 5G communication network 400. San Francisco data center 423 comprises an example of AMF 125, NRF 126, SMF 127, and UPF 128, although these network functions may differ. San Francisco data center 423 comprises NF hardware 1001, NF hardware drivers 1002, NF operating systems 1003, NF virtual layer 1004, and NF SW 1005. NF hardware 1001 comprises NICs, CPU, RAM, DRIVE, and DSW. NF hardware drivers 1002 comprise software that is resident in the NIC, CPU, RAM, DRIVE, and DSW. NF operating systems 1003 comprise kernels, modules, and applications that form containers for virtual layer and NF software execution. NF virtual layer 1004 comprises vNIC, vCPU, vRAM, vDRIVE, and vSW. NF SW 1005 comprises IWF SW 1024, AMF SW 1025, NRF SW 1026, SMF SW 1027, and UPF SW 1028. Other NF SW like PCF SW is typically present but is omitted for clarity. San Francisco data center 423 may be located at a single site or be distributed across multiple geographic locations. The NIC in NF hardware 1001 are coupled to WIFI AN 421, 5GNR AN 422, 5GNR AN 412, Hawaii data center 413, and external systems. NF hardware 1001 executes NF hardware drivers 1002, NF operating systems 1003, NF virtual layer 1004, and NF SW 1005 to form and operate IWF 424, AMF 425, NRF 426, SMF 427, and UPF 428 as described herein.

Figure 11:
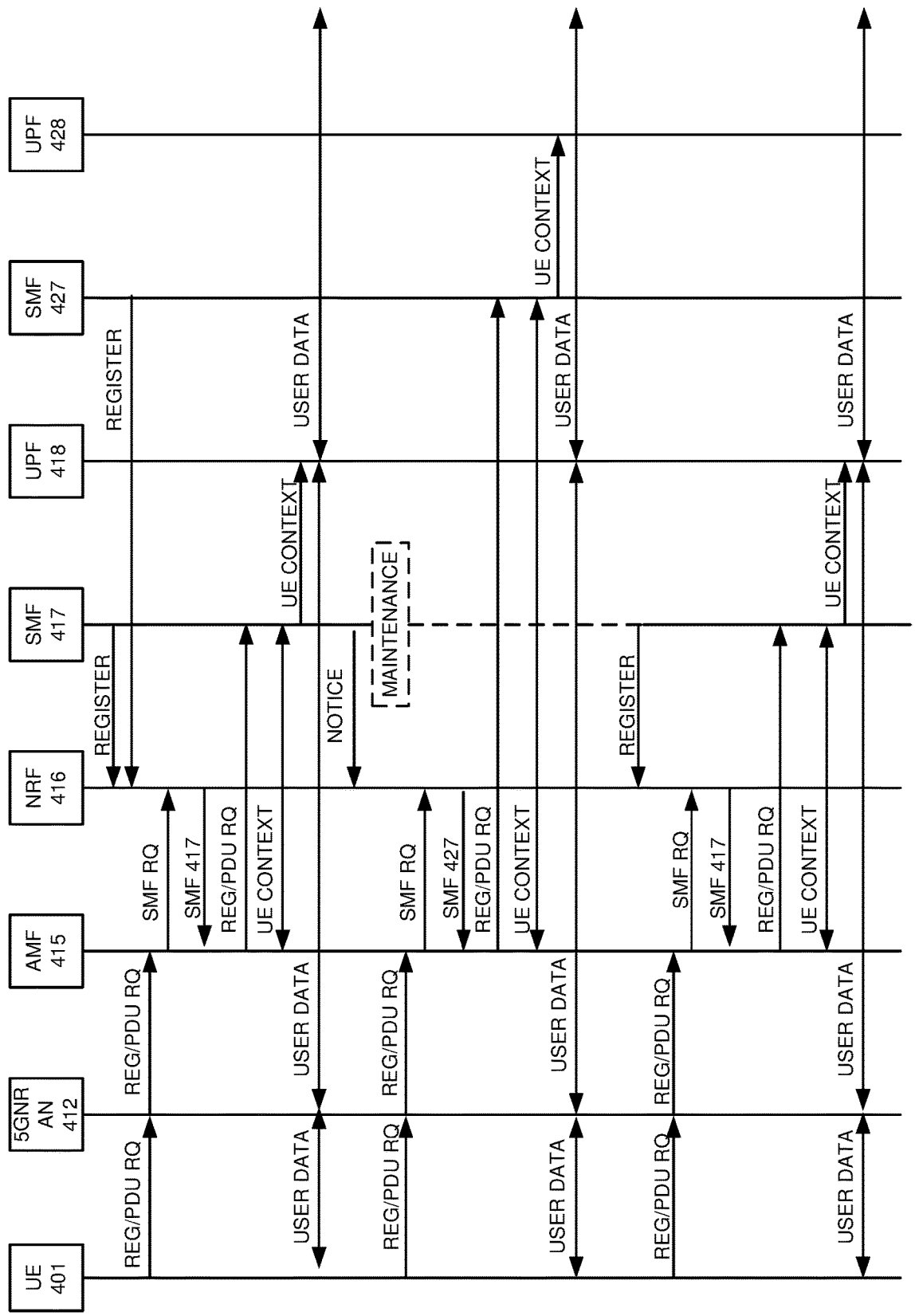
FIG. 11 illustrates an exemplary operation of the 5G communication network to handle the SMF outages.

FIG. 11 illustrates an exemplary operation of 5G communication network 400 to handle the SMF outages. The operation may differ in other examples. SMF 417 registers with NRF 416 as a primary SMF that is located in Hawaii TA 410. SMF 427 also registers with NRF 416 as a primary SMF for Hawaii TA 410 that is located in San Francisco TA 420. UE 401 transfer a Registration/PDU Establishment Request (REG/PDU RQ) to AMF 415 over 5GNR AN 412 and indicates its location in Hawaii TA 410. To serve UE 401, AMF 415 transfers an SMF request for UE 401 to NRF 416 and indicates that UE 401 is located in Hawaii TA 410.

NRF 416 receives the SMF request from AMF 415 and selects SMF 417 per its TA list, because SMF 417 is a primary SMF in Hawaii TA 410 which includes UE 401. NRF 416 indicates selected SMF 417 to AMF 415. AMF 415 transfers the Registration/PDU Establishment Request for UE 401 to SMF 417 and they exchange signaling to develop UE context for UE 401. SMF 417 directs UPF 418 to exchange user data for UE 401 between 5GNR AN 412 and external systems. UE 401 exchanges user data over 5GNR AN 412 and UPF 418 to support services like internet-access, IMS, and machine-control.

SMF 417 sends an outage notice to NRF 416 prior to an SMF maintenance event. UE 401 transfers a Registration/PDU Establishment Request that indicates its Hawaii TA 410 to AMF 415 over 5GNR AN 412. To serve UE 401, AMF 415 transfers an SMF request to NRF 416 that indicates that UE 401 is in Hawaii TA 410. NRF 416 receives the SMF request from AMF 415 and selects SMF 427 per its TA list, because no primary SMFs are currently available in Hawaii TA 410 and SMF 427 from San Francisco TA 420 is currently available as a primary SMF for Hawaii TA 410. NRF 416 uses its prioritized list of TAs to select San Francisco TA 420 and SMF 427 over other SMFs in other TAs when the primary SMFs in top-priority Hawaii TA 410 are not available. NRF 416 indicates selected SMF 427 to AMF 415. AMF 415 transfers the Registration/PDU Establishment Request for UE 401 to SMF 427 and they exchange signaling to develop UE context for UE 401. SMF 427 directs UPF 428 to exchange user data for UE 401 between 5GNR AN 412 and external systems. UE 401 exchanges user data over 5GNR AN 412 and UPF 428 to support services like internet-access, IMS, and machine-control.

After the completion of the maintenance, SMF 417 again registers with NRF 416 as a primary SMF in Hawaii TA 410. UE 401 transfers a Registration/PDU Establishment Request to AMF 415 over 5GNR AN 412 and indicates its location in Hawaii TA 410. To serve UE 401, AMF 415 transfers an SMF request for UE 401 to NRF 416 and indicates that UE 401 is located in Hawaii TA 410. NRF 416 receives the SMF request from AMF 415 and selects SMF 417, because SMF 417 is again a primary SMF in Hawaii TA 410 which includes UE 401. NRF 416 indicates selected SMF 417 to AMF 415. AMF 415 transfers the Registration/PDU Establishment Request for UE 401 to SMF 417 and they exchange signaling to develop UE context for UE 401. SMF 417 directs UPF 418 to exchange user data for UE 401 between 5GNR AN 412 and external systems. UE 401 again exchanges user data over 5GNR AN 412 and UPF 418 to support services like internet-access, IMS, and machine-control.

The wireless data network circuitry described above comprises computer hardware and software that form special-purpose wireless network circuitry to handle SMF outages. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to handle the SMF outages.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to handle a Session Management Function (SMF) outage in a Tracking Area (TA), the method comprising:
   an external SMF that is outside the TA registering with an internal Network Repository Function (NRF) that is inside in the TA;
   the internal NRF detecting the SMF outage for an internal SMF inside the TA;
   the internal NRF receiving an SMF request from an internal Access and Mobility Management Function (AMF) inside the TA, and in response to the SMF outage, transferring an SMF response to the internal AMF that indicates the external SMF; and
   the external SMF receiving network signaling from the internal AMF and responsively directing an external User Plane Function (UPF) that is outside the TA to exchange user data with internal wireless access nodes that are inside the TA.

2. The method of claim 1 wherein:
   the external SMF registering with the internal NRF comprises indicating that the external SMF is located in a different TA; and
   the internal NRF transferring the SMF response comprises selecting the external SMF based on the SMF location in the different TA.

3. The method of claim 1 wherein:
   the external SMF registering with the internal NRF comprises indicating that the external SMF comprises a primary SMF for the TA; and
   the internal NRF transferring the SMF response comprises selecting the external SMF based on the primary SMF indication.

4. The method of claim 1 wherein:
the external SMF registering with the internal NRF comprises indicating that the external SMF comprises a primary SMF for the TA and is located in a different TA; and
the internal NRF transferring the SMF response comprises selecting the external SMF based on the primary SMF indication and the SMF location in the different TA.

5. The method of claim 1 further comprising:
the internal SMF registering with the internal NRF;
the internal NRF receiving a prior SMF request from the internal AMF inside the TA, and before the SMF outage, transferring a prior SMF response to the internal AMF that indicates the internal SMF; and
the internal SMF receiving prior network signaling from the internal AMF and responsively directing an internal UPF that is inside the TA to exchange prior user data with the internal serving wireless access nodes that are inside the TA.

6. The method of claim 1 wherein the external SMF is located inside a different TA and further comprising:
the external SMF registering with an external NRF that is inside the different TA;
the external NRF receiving another SMF request from an external AMF that is inside the different TA and transferring another SMF response to the external AMF that indicates the external SMF; and
the external SMF receiving additional network signaling from the external AMF and responsively directing at least one of the external UPF and another external UPF that are inside the different TA to exchange additional user data with external serving wireless access nodes that are inside the different TA.

7. The method of claim 1 wherein the SMF outage comprises an SMF maintenance event.

8. The method of claim 1 wherein the serving TA comprises a geographic island.

9. The method of claim 1 wherein the exchange of the user data comprises an Internet Protocol Multimedia Subsystem (IMS) service.

10. The method of claim 1 wherein the exchange of the user data comprises an internet-access service.

11. A wireless communication network to handle a Session Management Function (SMF) outage in a Tracking Area (TA), the wireless communication network comprising:
an external SMF that is outside the TA configured to register with an internal Network Repository Function (NRF) that is inside in the TA;
the internal NRF configured to detect the SMF outage for an internal SMF inside the TA;
the internal NRF configured to receive an SMF request from an internal Access and Mobility Management Function (AMF) inside the TA, and in response to the SMF outage, transfer an SMF response to the internal AMF that indicates the external SMF; and
the external SMF configured to receive network signaling from the internal AMF and responsively direct an external User Plane Function (UPF) that is outside the TA to exchange user data with internal wireless access nodes that are inside the TA.

12. The wireless communication network of claim 11 wherein:
the external SMF is configured to indicate that the external SMF is located in a different TA to register with the internal NRF; and
the internal NRF is configured to select the external SMF based on the SMF location in the different TA to transfer the SMF response.

13. The wireless communication network of claim 11 wherein:
the external SMF is configured to indicate that the external SMF comprises a primary SMF for the TA to register with the internal NRF; and
the internal NRF is configured to select the external SMF based on the primary SMF indication to transfer the SMF response.

14. The wireless communication network of claim 11 wherein:
the external SMF is configured to indicate that the external SMF comprises a primary SMF for the TA and is located in a different TA to register with the internal NRF; and
the internal NRF is configured to select the external SMF based on the primary SMF indication and the SMF location in the different TA to transfer the SMF response.

15. The wireless communication network of claim 11 further comprising:
the internal SMF configured to register with the internal NRF;
the internal NRF is configured to receive a prior SMF request from the internal AMF inside the TA, and before the SMF outage, transfer a prior SMF response to the internal AMF that indicates the internal SMF; and
the internal SMF is configured to receive prior network signaling from the internal AMF and responsively direct an internal UPF that is inside the TA to exchange prior user data with the internal serving wireless access nodes that are inside the TA.

16. The wireless communication network of claim 11 wherein the external SMF is located inside a different TA and further comprising:
the external SMF is configured to register with an external NRF that is inside the different TA;
the external NRF is configured to receive another SMF request from an external AMF that is inside the different TA and transfer another SMF response to the external AMF that indicates the external SMF; and
the external SMF is configured to receive additional network signaling from the external AMF and responsively direct at least one of the external UPF and another external UPF that are inside the different TA to exchange additional user data with external serving wireless access nodes that are inside the different TA.

17. The wireless communication network of claim 11 wherein the SMF outage comprises an SMF maintenance event.

18. The wireless communication network of claim 11 wherein the serving TA comprises a geographic island.

19. The wireless communication network of claim 11 wherein the exchange of the user data comprises an Internet Protocol Multimedia Subsystem (IMS) service.

20. The wireless communication network of claim 11 wherein the exchange of the user data comprises an internet-access service.

* * * * *